United States Patent
Charlier et al.

(10) Patent No.: US 6,934,568 B2
(45) Date of Patent: Aug. 23, 2005

(54) EXTENDING HINGED FLIP APPARATUS FOR A COMMUNICATION DEVICE

(75) Inventors: Michael L. Charlier, Palatine, IL (US); Thomas E. Gitzinger, Jr., Palatine, IL (US); Paul R. Steuer, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 422 days.

(21) Appl. No.: 10/093,768

(22) Filed: Mar. 8, 2002

(65) Prior Publication Data

US 2004/0203484 A1  Oct. 14, 2004

(51) Int. Cl.$^7$ .................................................. H04B 1/38
(52) U.S. Cl. ................ 455/575.3; 455/90.3; 455/570.1; 455/575.1; 379/433.12; 379/433.13
(58) Field of Search .............................. 455/90.3, 570.1, 455/575.1, 575.3, 575.4, 348, 349; 379/433.12, 433.13

(56) References Cited

U.S. PATENT DOCUMENTS

| | | | |
|---|---|---|---|
| 5,109,539 A | 4/1992 | Inubushi et al. | |
| 5,369,788 A | 11/1994 | Nagai | |
| 5,450,619 A | 9/1995 | Maeda | |
| 5,564,078 A | 10/1996 | Nagai | |
| 5,710,576 A | 1/1998 | Nishiyama et al. | |
| 5,907,615 A | * 5/1999 | Kaschke | 379/433.13 |
| 6,128,475 A | 10/2000 | Wicks et al. | |
| 6,243,595 B1 | 6/2001 | Lee et al. | |
| 6,249,672 B1 | * 6/2001 | Castiel | 455/575.4 |
| 6,766,181 B1 | * 7/2004 | Newman et al. | 455/575.3 |

* cited by examiner

*Primary Examiner*—Vivian Chin
*Assistant Examiner*—Sanh Phu
(74) *Attorney, Agent, or Firm*—Brian M. Mancini; Randall S. Vaas

(57) ABSTRACT

A communication device with an extending hinged flip apparatus includes three interconnected movable housings. A base housing includes a user interface and most of the electronics of the device. A flip housing is coupled by a hinge assembly to the base housing. An extendable housing is configured to slideably engage the base housing. A latch mechanism mechanically coupling the flip housing to the extendable housing in a latched position. When the latched is released, the flip housing rotates out and the extendable housing extends to provide a device with a length that is effectively more than double the device length in the latched position.

17 Claims, 4 Drawing Sheets

EXTENDING HINGED FLIP APPARATUS FOR A COMMUNICATION DEVICE

FIELD OF THE INVENTION

This invention relates in general to housing assemblies, and in particular, to housing assemblies used on electronic devices.

BACKGROUND OF THE INVENTION

Hand held communication devices appear in a variety of shapes and form factors. User ergonomics is an important factor to consider in designing such products. The trend is for smaller and smaller devices. However, consumers also desire larger displays and user interfaces that are easy to use. For example, one or two line displays are inadequate to provide large amounts of information, such as is available from the Internet. In addition, buttons that are too small or close will cause input errors and thereby user frustration. Further, communication is more effective when the mouthpiece and earpiece are located in close corresponding proximity to a user's mouth and ear.

One solution is to use a flip or a clamshell section. This physically increases the length of the device. However, typically the flip section does not have a microphone built in, but rather redirects sound waves back to a microphone in the main housing of the device. As a result, the flip section does not actually provide a normal ear-to-mouth distance between the user and the telephone, but it does effectively increase the length of the ear-to-mouth distance. The flip section does provide a user with an increased comfort level due to the ergonomic configuration of the flip section. A flip section also has the advantage of protection of the user interfaces, such as the keypad and the display of the telephone.

Another solution is to provide an extendable section for the radiotelephone. Such devices can actual extend the mouthpiece to earpiece distance to up to double the length. However, this approach may still not provide normal ear-to-mouth distance between the user and the telephone. In addition, this approach fails to provide the user interface protection of a flip section or to protect electronic controls from accidental engagement.

What is needed is a radiotelephone device that can provide user interface protection when not in use, with an actual increase between the mouthpiece and earpiece of the radiotelephone when in use. It would also be an advantage to provide a radiotelephone that can expand to over double its effective length to further improve actual and ergonomic function. It would also be beneficial to provide easy, one-hand opening of the unit and comfortable operation for a user.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENTS

The present invention provides a radiotelephone device that can provide user interface protection when not in use, and an increased distance between the mouthpiece and earpiece of the radiotelephone when in use. Advantageously, the radiotelephone can expand to over double its effective length to further improve actual and ergonomic function. In addition, an easy and comfortable operation is provided for a user.

The radiotelephone portion of the communication device is preferably a cellular radiotelephone adapted for personal communication or personal computing, but may also be a pager, cordless radiotelephone, or a personal communication service (PCS) radiotelephone. The radiotelephone portion may be constructed in accordance with an analog communication standard or a digital communication standard. The radiotelephone portion generally includes a radio frequency (RF) transceiver, a controller, an antenna, a battery, a vibrator, filters, a frequency synthesizer, a signal processor, and a user interface including at least one of a keypad, control switches, a display, a microphone, and a speaker. The electronics incorporated into a cellular phone, two-way radio or selective radio receiver, such as a pager, are well known in the art, and may be incorporated into the electronic unit.

Figure 2:
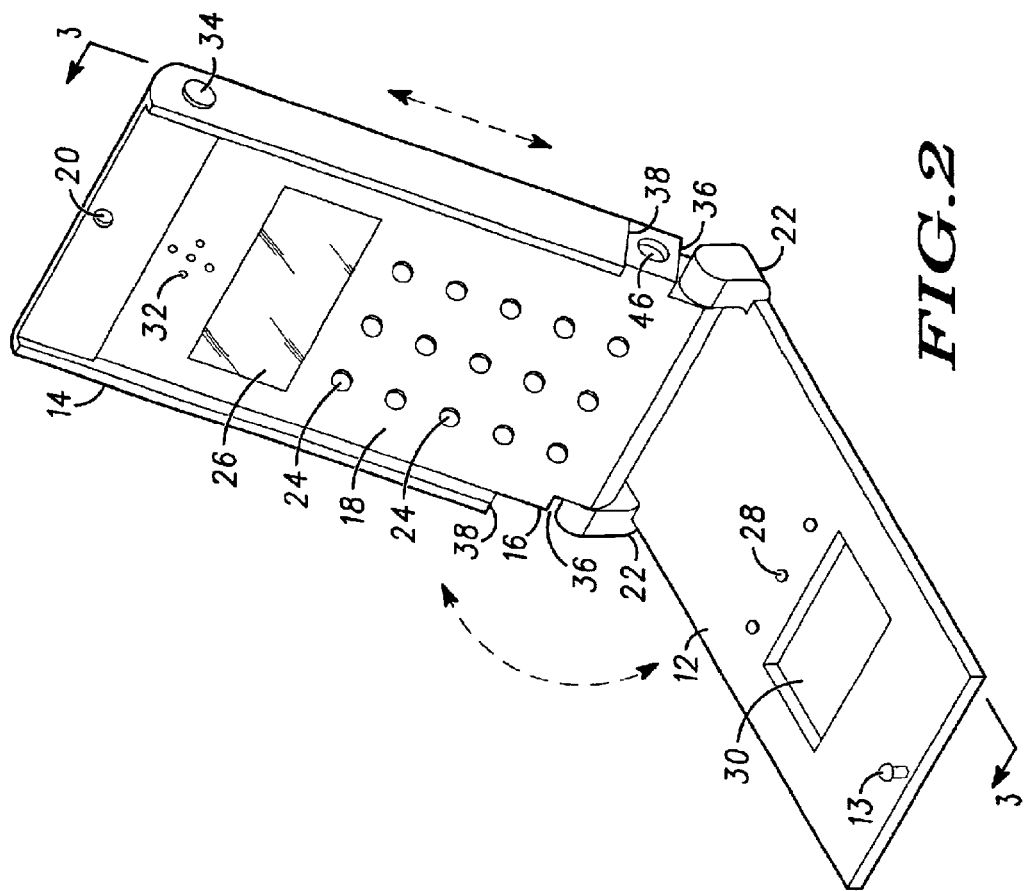
FIG. 2 shows the communication device of FIG. 1 in an open position.
Figure 1:
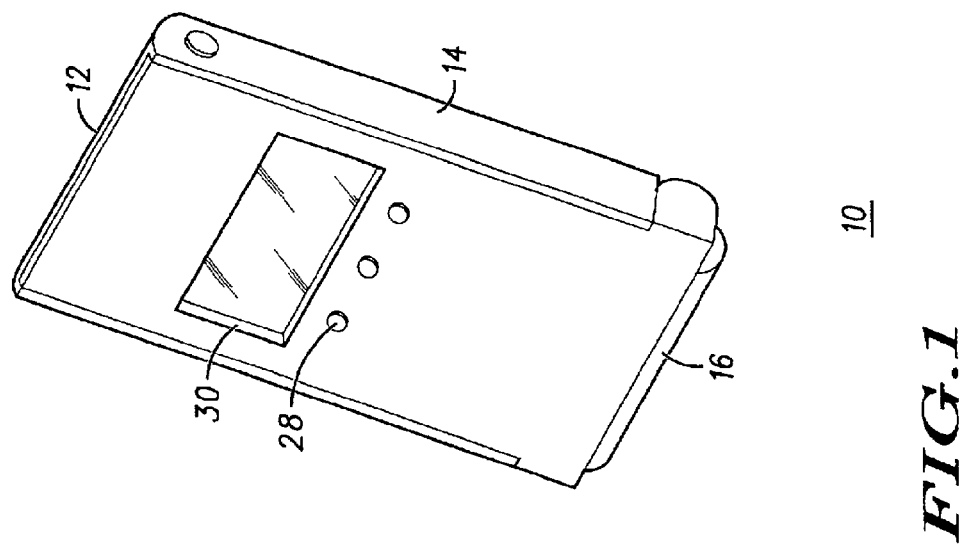
FIG. 1 shows a perspective front view of a communication device with an extended hinged flip apparatus in a latched position, in accordance with the present invention.

Referring to FIGS. 1 and 2, a communication device 10 such as a portable radiotelephone is shown which incorporates an extending hinged flip apparatus, in accordance with the present invention. The device 10 includes a base housing 16, an extendable housing 14, and a flip housing 12, in a clamshell configuration. The device 10, and in particular, the base housing 16 contains electronic circuitry which allows communications over a radio frequency channel. The base housing 16 includes a front surface 18 wherein a user interface is disposed. The flip housing 12, commonly referred to with various names such as a clamshell, flip door, flip, or flap, is mechanically and rotatably coupled by a hinge assembly 22 to the base housing 16. The flip housing has a closed position (FIG. 1) being in proximity to the front surface 18 of the base housing 16 and an open position (FIG. 2) where the flip housing 12 extends away from the base housing 16. The flip housing 12 can rotate between the open position for a telephone operation, and the closed position for a two-way radio operation, for example.

The extendable housing 14 is configured to slideably engage the base housing 16 and has an extended position (shown in FIG. 2) and a collapsed position (shown in FIG. 1). Two edges 36 of the base housing are circularly contoured to engage channels 38 in the extendable housing. The channels 38 include at least two circular sidewalls surrounding and retaining the base housing 16. It should be recognized that the base housing edges and extendable housing channels can be of any other suitable shape to slideably engage each other. Preferably, the extendable housing 14 covers a headset jack 46 on the base housing 16 when in the collapsed position. In this way, the headset jack 46 can only be accessed when the device 10 is open. This is particularly useful where an antenna of the device is deployed on one of the flip or extending housings, forcing the antenna to be deployed during a call.

A latch mechanism 20 mechanically couples one or more of the flip housing 12 and extendable housing 14 in a closed position, as shown in FIG. 1. Preferably, when the latch mechanism is latched the flip housing is in the closed position and the extendable housing is in the collapsed position, and the latch mechanism couples the flip housing 12 directly to the extendable housing 14. In one embodiment, a pin 13 engageably inserts into a slot 20 to latch the communication device closed. A latch release mechanism 34 is optionally provided to release the latch mechanism, whereby the communication device automatically expands into an open position (flip 12 open and housing 14 extended). Separate latch mechanisms can also be provided to latch either or both of the flip housing and extendable housing to the base housing.

The communication device 10 as presented in this preferred embodiment, is capable of providing multiple modes of operation. Namely, the device 10 may operate in telephone or two-way mode of operation. Alternatively, messaging or data modes may be accommodated. In the messaging mode, the device 100 may be used to receive pages as any other pager available as a stand-alone product. In the data mode of operation, the device 10 may be used as a portable data machine. In addition, the device 10 may be used as a telephone. Further, an incoming call may be answered without opening up the cover, although it is preferred that the device 10 be used in the completely open, extended position. In addition, a mode of operation of the communication can be automatically controlled by one or more of the actions of: releasing the latch mechanism, the rotation of the flip housing on the hinge assembly, and the extension of the extendable housing.

The open flip housing 12 exposes the user interface including control keys 24, display 26, and a speaker 32, for example. The operation of the keys in this embodiment is similar to the keys of a regular telephone or other communication devices as it known in the art. The user interface can also be accessible by the user through the closed flip housing through an arrangement of key actuators 28 for abutting with the keys on the base housing underneath and a window 30. The key actuators 28 pass through from a front surface to a back surface of the flip housing 12. As such, when the flip is closed the key actuator, when pressed, couple with keys 24 that are located directly below them. This coupling communicates a push applied to key actuators 28 from the front surface of the flip to the keys 24 on the front surface 18. By providing the key actuators 28, the device 10 is provided with functionality with the flip open or closed.

When closed, the flip housing 12 protects the user interface from damage or inadvertent engagement. Between calls, a user will typically keep the flip closed. Therefore, it is beneficial for these users to be able to view the display 26 underneath the closed flip of the communication device via the window 30. Being able to view the display underneath while the flip is closed before opening the flip for receiving an incoming call could also be desirable, such as being able to see the caller's phone number before deciding whether to receive the call or not. It is also be desirable to actuate the keys underneath the flip via the key actuators 28 to receive the call or to end it, without first opening the flip as with a conventional flip. The window 30 can be integrated with the flip housing 12 for viewing the display 26 on the front surface 18 of the base housing 16 underneath. The flip housing 12 is preferably made from a transparent plastic material, with the integral window area left unpainted for see-through-viewing, while the rest of the flip could be painted to match one of the other housings 14,16 of the communication device if desired.

Figure 3:
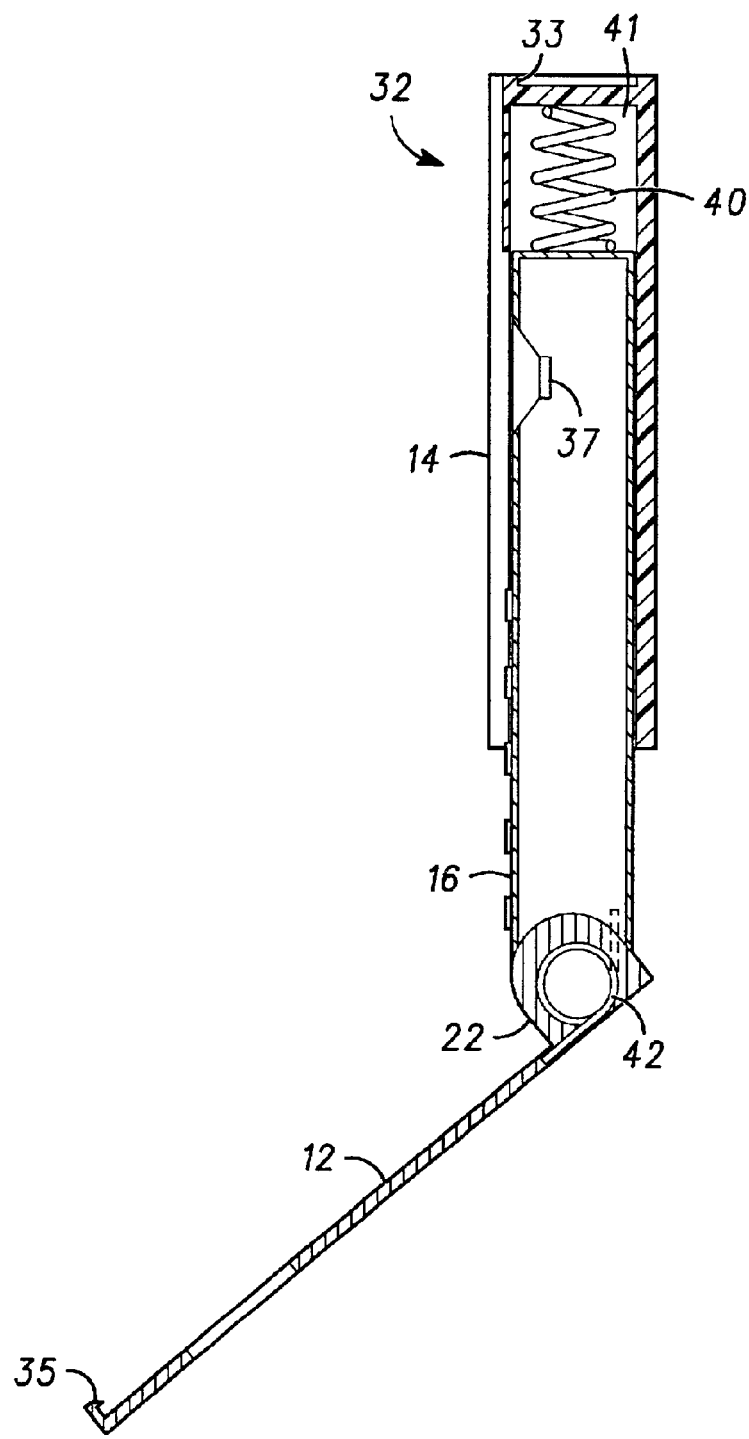
FIG. 3 shows a right-side cross-sectional view of the device of FIG. 2.

Referring to FIG. 3, the communication device includes a speaker 37 behind a speaker port 32 or grille. The speaker 37 is preferably mounted on the base housing 16 (as shown), but can also be located on the extendable housing 14 and ported out the extendable housing 14. The extended housing 14 and the base housing 16 define an acoustic chamber 41 in the space therebetween for the speaker to provide improve acoustic response. Optionally, the speaker output can be ported out of either the base housing or extendable housing. FIG. 3 also shows an alternative latch mechanism, wherein a raised lip 35 outlines an edge of the flip housing 12. A slightly raised lip 33 is also provided on an edge of the extendable housing 14 to form a mating edge with the corresponding lip 35 on the flip housing when the flip is closed and the extendable housing is collapsed. The lips 33,35 capture each other to hold the communication device in a closed, latched position. In this case, a separate latch release mechanism is not needed as the device can be opened by the user with just a pull on the flip cover to disengage the lips. Other variations of interlocking features can also be provided with equal success. In addition to the pin and socket and captured lips previously described, other types of sliding, snapping, rotating catches, and the like can also be used.

The flip housing 12 includes a spring loaded hinge assembly 22. The hinge assembly 22 includes two corners (as shown in FIG. 2). One or more of the corners can include a torsional spring 42 in a recessed inner hollow area or cavity of the hinge assembly 22. The spring 42 is rotatably coupled to the flip housing 12 and base housing 16 and is biased to open the flip housing 12 such that when the latch mechanism is released the flip housing 12 rotates on the hinge assembly 22 from the closed position to the open position at a predetermined angle with the base housing 16. Other variations of the hinge assembly and spring configuration are possible, as long as the spring serves to open the flip. The torsional spring 42 can also be adjustably viscously damped to provide a predetermined rate of opening upon release of the latch mechanism. Many types of viscous or frictional damping materials can be used, as are known in the art. In addition, stops and cams can also be included to limit and control the motion and angle of the flip housing with respect to the base housing.

The extendable housing 14 is also spring loaded against the base housing 16. In this case, a fully collapsible spring 40 is used, such that when the latch mechanism is released the extendable housing extends from the collapsed position to the extended position at a predetermined distance from with the base housing 16. Different spring assemblies can be used as are known in the art. In addition, viscous or frictional damping materials can be used, as are known in the art. Moreover, stops can be included to limit and control the range of motion of the extendable housing with respect to the base housing. The speaker 37 is mounted at the very top of the device (or nested behind the display and ported out the top), so the extension of the housing 14 provides good ear positioning when the radiotelephone is held against the head of a user. The springs 42,40 of the flip and speaker housing provide forces along different trajectories so they are able to provide a firm latch when the two parts are overlapped and latched. Advantageously, this type of latching technique is unlikely to be easily disengaged in a users briefcase or pocket.

In a preferred embodiment, the base housing is substantially enclosed by the flip housing and the extendable housing when the latch mechanism is latched (represented in FIG. 1). Along these lines, the flip housing substantially covers the front surface of the base housing when in the closed position.

Figure 4:
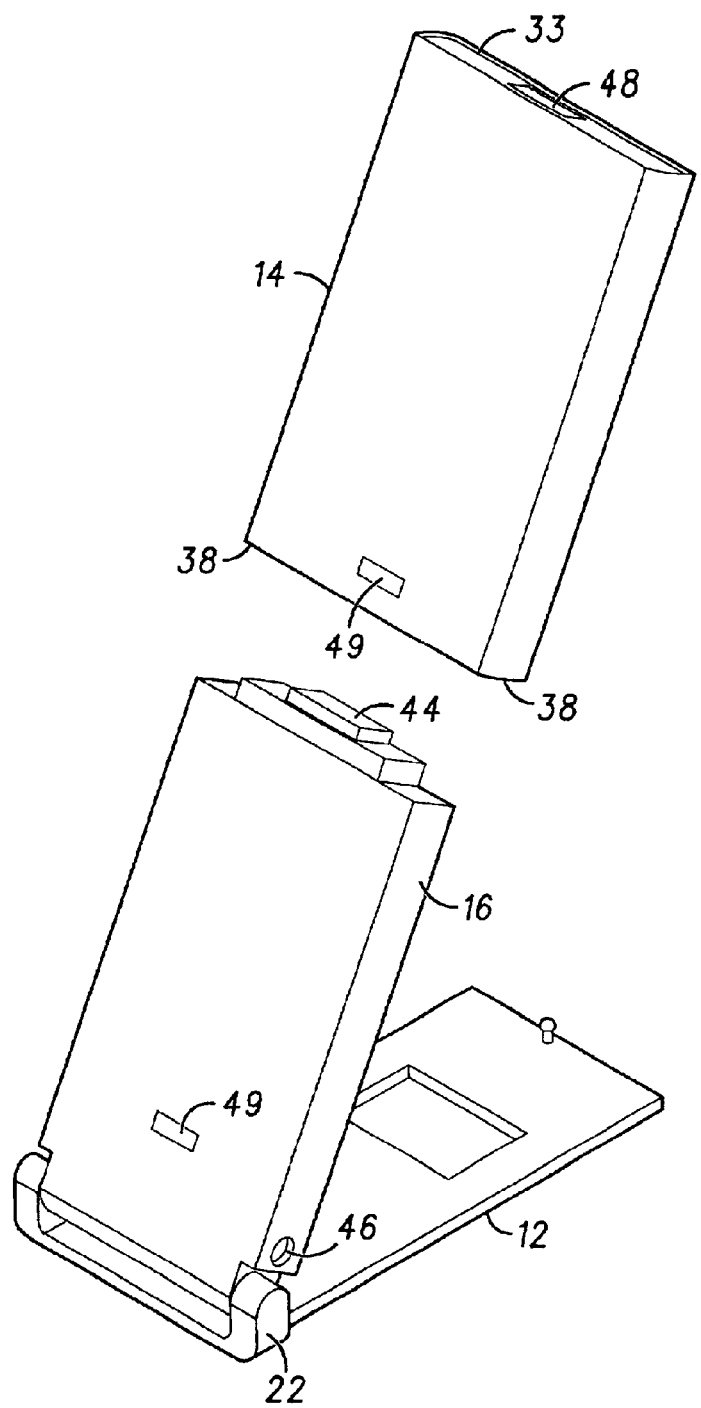
FIG. 4 shows a rear perspective exploded view with a removed extendable housing, in accordance with the present invention.
Figure 5:
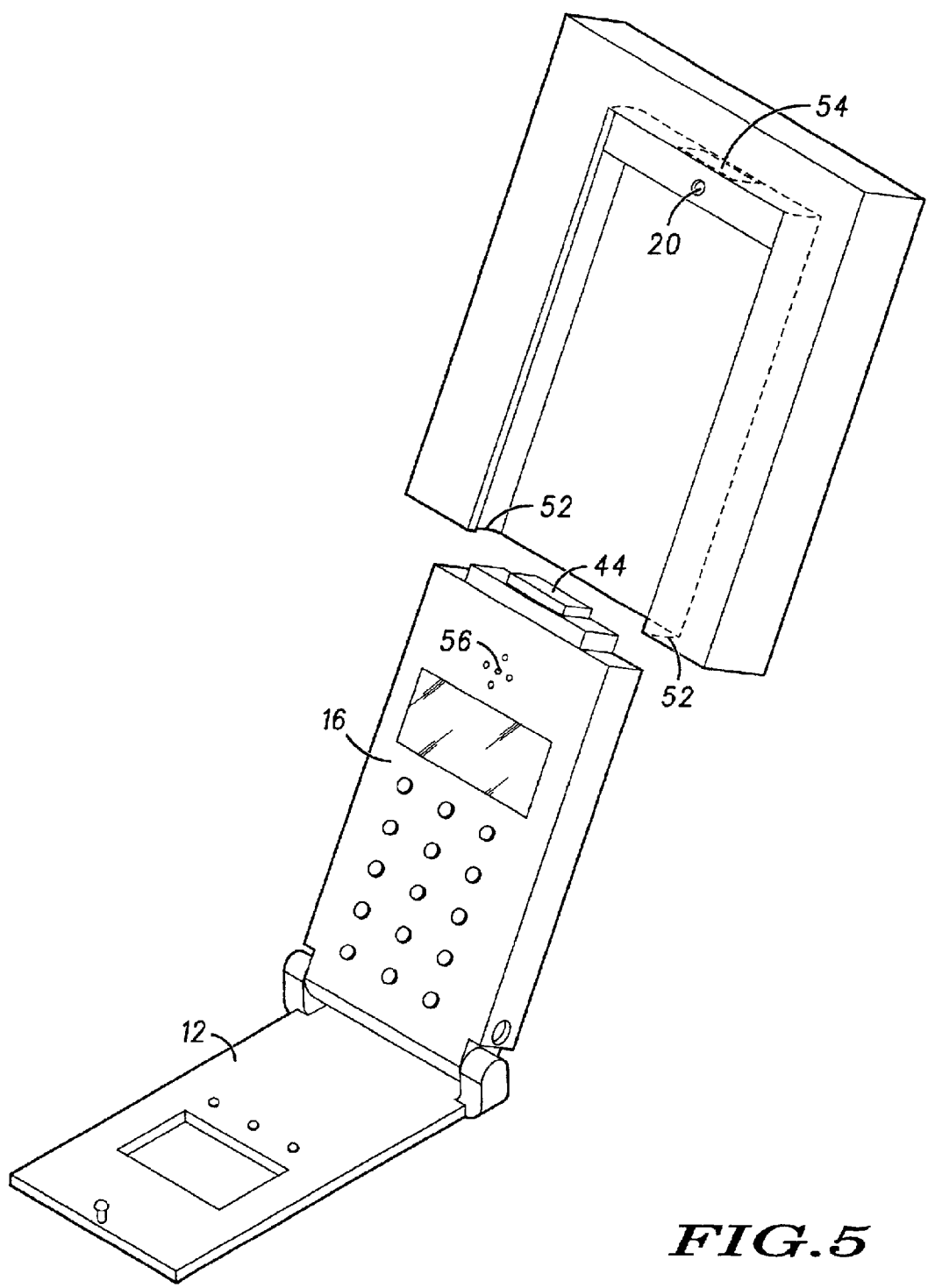
FIG. 5 shows a front perspective exploded view of the device with an external module, in accordance with the present invention.

Referring to FIG. 4, the communication device also includes an electrical input/output connector 44 disposed on an end of the base housing 16 distal from the hinge assembly 22. This connector adds external functionality to the device. Access to the connector 44 can be obtained by a removable access port 48 consisting of an end cap on the extendable housing 14 such as a rubber grommet, a plug in a rear side of the extendable housing 14 near the connector, or by removal of the housing 14 itself to expose the connector 44. The latter case facilitates connection to external accessories such as an automobile adapter. A separate latch and release mechanism 49 can be provided for the extendable housing 14. The mechanism 49 can include small tabs and other protrusions for engaging with corresponding receiving tabs on the base housing 16. Other types of latches can be provided as are known in the art. The separate sides of the extendable housing 14 can be squeezed together by pressing the at sides of the channels 38 to provide clearance for the tabs of the latch mechanism 49 to release the extendable housing 14 from the base housing 16 for removal. Advantageously, when the extendable housing is removed, an external electronic module 50 can be provided that has channels 52 to slideably engage the base housing 16 and a socket 54 to connect to the connector 44 on the base housing 16, as shown in FIG. 5. The external module 50 can also provide a separate speaker 56 for the communication device. This can also be useful for operating the device in a loudspeaker mode. The external module can be separately powered or powered by the communication device, and can include such functionality as a personal digital assistant (PDA), global positioning system (GPS) module, FM radio, MP3 player, Bluetooth module, optical interface, camera, and the like. In some of these applications, the radiotelephone can be treated as an RF modem for the host device (external module), giving the combined consumer solution incredible power for advanced wireless data applications.

In many of these cases, it is desirable to have the accessory located at the top of the phone for human factors considerations. In current phone designs, the space at top of the phone is dominated by the antenna, which makes it very difficult to add functionality to that area without impairing the performance of the phone. The present invention allows placement of the antenna at locations other than at the top of the device, and placement of the I/O connector at the top of the device, which allows much more flexibility in the design of clip-on accessories.

In practice, and referring back to FIG. 4, the extendable housing 14 consists of an extruded sleeve with a molded end cap (access port 48). This configuration provides flexibility in function. It is desirable to keep the outside shell metal for physical strength and cosmetic appearance reasons. Preferably, the end cap is non-conductive to facilitate antenna efficiency in the closed position. Also, making the end cap out of a separate piece also provides flexibility with modular accessory add-ons and textures.

In summary, the present invention provides a communication device with a very small collapsed form factor while providing the capability to expand the phone to a usable size with a one-handed operation. It consists of a spring loaded thin flip covering the entire front surface of the phone, that latches onto a spring loaded extending cover that encapsulates the top, back and sides of the phone.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A communication device with an extending hinged flip apparatus.

the apparatus comprising:
a base housing, the base housing having a front surface;
a flip housing, the flip housing mechanically coupled by a hinge assembly to the base housing, the flip housing having a closed position being in proximity to the front surface of the base housing and an open position extending away from the base housing;
an extendable housing, the extendable housing configured to slideably engage the base housing and having an extended position and a collapsed position;
a latch mechanism, the latch mechanism mechanically coupling one or more of the flip housing and extendable housing in a closed position; and
wherein the base housing is substantially enclosed by the flip housing and the extendable housing when the latch mechanism is latched.

2. A communication device with an extending hinged flip apparatus, the apparatus comprising:
a base housing, the base housing having a front surface;
a flip housing, the flip housing mechanically coupled by a hinge assembly to the base housing, the flip housing having a closed position being in proximity to the front surface of the base housing and an open position extending away from the base housing;

an extendable housing, the extendable housing configured to slideably engage the base housing and having an extended position and a collapsed position;

a latch mechanism, the latch mechanisn mechanically coupling one or more of the flip housing and extendable housing in a closed position; and an electrical input/output connector disposed on an end of the base housing distal from the hinge assembly, and wherein the extendable housing is removable to expose the connector.

3. The apparatus of claim 2, wherein the flip housing includes a spring loaded hinge assembly, such that when the latch mechanism is released the flip housing rotates on the hinge assembly from the closed position to the open position at a predetermined angle with the base housing.

4. The apparatus of claim 2, wherein the extendable housing is spring loaded against the base housing, such that when the latch mechanism is released the extendable housing extends from the collapsed position to the extended position at a predetermined distance from with the base housing.

5. The apparatus of claim 2, wherein the flip housing includes a spring loaded hinge assembly and the extendable housing is spring loaded against the base housing, such that when the latch mechanism is released the flip housing rotates on the hinge assembly from the closed position to the open position to a predetermined angle with the base housing, and the extendable housing extends from the collapsed position to the extended position at a predetermined distance from with the base housing.

6. The apparatus of claim 2, wherein when the latch mechanism is latched the flip housing is in the closed position and the extendable housing is in the collapsed position.

7. The apparatus of claim 2, wherein a mode of operation of the communication is automatically control by one or more of the group consisting of the releasing the latch mechanism, the rotation of the flip housing on the hinge assembly, and the extension of the extendable housing.

8. The apparatus of claim 2, wherein the flip housing substantially covers the front surface of the base housing when in the closed position.

9. A communication device with an extending hinged flip apparatus, the apparatus comprising:
a base housing, the base housing having a user interface of the communication device disposed on a front surface thereof;
a flip housing, the flip housing mechanically coupled by a spring loaded hinge assembly to the base housing, the flip housing having a closed position being in proximity to the front surface of the base housing and an open position extending away from the base housing;
a spring loaded extendable housing, the extendable housing including an earpiece and is configured to slideably engage the base housing between an extended position and a collapsed position;
a latch mechanism, the latch mechanism mechanically locking the closed flip housing to the collapsed extendable housing latched position, and wherein when the latch mechanism is released the flip housing rotates on the hinge assembly from the closed position to the open position to a predetermined angle with the base housing, and the extendable housing extends from the collapsed position to the extended position at a predetermined distance from with the base housing; and an electrical input/output connector disposed on an end of the base housing distal from the hinge assembly, and wherein the extendable housing is removable to expose the connector.

10. The apparatus of claim 9, wherein a mode of operation of the communication is automatically control by one or more of the group consisting of: the releasing the latch mechanism, the rotation of the flip housing on the hinge assembly, and the extension of the extendable housing.

11. The apparatus of claim 9, wherein the base housing is substantially enclosed by the flip housing and the extendable housing in the latched position.

12. The apparatus of claim 9, wherein the flip housing substantially covers the front surface of the base housing when in the closed position.

13. The apparatus of claim 9, wherein the extandable housing includes an access port for the connector.

14. A communication device with an extending hinged flip apparatus, the apparatus comprising:
a base housing, the base housing having a user interface of the communication device disposed on a front surface thereof;
a flip housing, the flip housing mechanically coupled by a spring loaded hinge assembly to the base housing, the flip housing having a closed position being in proximity to the front surface of the base housing and an open position extending away from the base housing;
a spring loaded extendable housing, the extendable housing including an earpiece and is configured to slideably engage the base housing between an extended position and a collapsed position; and
a latch mechanism, the latch mechanism mechanically locking the closed flip housing to the collapsed extendable housing in a latched position, and wherein when the latch mechanism is released the flip housing rotates on the hinge assembly from the closed position to the open position to a predetermined angle with the base housing, and the extendable housing extends from the collapsed position to the extended position at a predetermined distance from with the base housing;

wherein the extendable housing covers a headset jack on the base housing when in the collapsed position.

15. A communication device with an extending hinged flip apparatus, the apparatus comprising:
a base housing, the base housing having a user interface of the communication device disposed on a front surface thereof;
a flip housing, the flip housing mechanically coupled by a spring loaded hinge assembly to the base housing, the flip housing having a closed position being in proximity to the front surface of the base housing and an open position extending away from the base housing;
a spring loaded extendable housing, the extendable housing including an earpiece and is configured to slideably engage the base housing between an extended position and a collapsed position; and a latch mechanism, the latch mechanism mechanically locking the closed flip housing to the collapsed extendable housing in a latched position, and wherein when the latch mechanism is released the flip housing rotates on the hinge assembly from the closed position to the open position to a predetermined angle with the base housing, and the extendable housing extends from the collapsed position to the extended position at a predetermined distance from with the base housing;

wherein the extendable housing, when extended, and base housing define an acoustic chamber in the space therebetween for the speaker.

16. A communication device with, an extending hinged flip apparatus, the apparatus comprising:

a base housing, the base housing having a user interface of the communication device disposed on a front surface thereof;

a flip housing, the flip housing mechanically coupled by a spring loaded hinge assembly to the base housing, the flip housing having a closed position being in proximity to the front surface of the base housing and an open position extending away from the base housing;

a spring loaded extendable housing, the extendable housing is configured to slideably engage the base housing between an extended position and a collapsed position;

a latch mechanism, the mechanism mechanically locking the closed flip housing to the collapsed extendable housing in a latched position, and wherein when the latch mechanism is released the flip housing rotates an the hinge assembly from the closed position to the open position to a predetermined angle with the base housing, and the extendable housing extends from the collapsed position to the extended position at a predetermined distance from with the base housing; and an electrical input/output connector disposed on an end of the base housing distal from the hinge assembly, and wherein the extendable housing is removable to expose the connector.

17. The apparatus of claim 16, wherein the extendable housing is removed, and further comprising an external electronic module that slideably engages the base housing and connects to the connector, the external module providing a separate speaker for the communication device.

* * * * *